United States Patent [19]
Tozaki et al.

[11] Patent Number: 6,160,951
[45] Date of Patent: *Dec. 12, 2000

[54] INFORMATION RECORDING MEDIUM AND INFORMATION REPRODUCING APPARATUS

[75] Inventors: Akihiro Tozaki, Tsurugashima; Hiroshi Nakamura; Junichi Yoshio, both of Tokorozawa, all of Japan

[73] Assignee: Pioneer Electronic Corporation, Tokyo, Japan

[*] Notice: This patent is subject to a terminal disclaimer.

[21] Appl. No.: 09/088,379

[22] Filed: Jun. 2, 1998

Related U.S. Application Data

[62] Division of application No. 08/677,196, Jul. 9, 1996, Pat. No. 5,787,222.

[30] Foreign Application Priority Data

Jul. 10, 1995 [JP] Japan ................ P07-173795

[51] Int. Cl.[7] .................. H04N 5/915; H04N 5/93
[52] U.S. Cl. ................... 386/46; 386/52
[58] Field of Search .................. 386/46, 52, 92, 386/55; 348/7, 12, 13; 455/4.1, 5.1; 388/1, 52, 55, 95; 360/32; H04N 5/915, 5/93

[56] References Cited

U.S. PATENT DOCUMENTS

| | | | |
|---|---|---|---|
| 5,172,111 | 12/1992 | Olivo, Jr. | 340/825.31 |
| 5,574,567 | 11/1996 | Cookson et al. | 386/46 |
| 5,684,918 | 11/1997 | Abecassis | 386/83 |
| 5,787,222 | 7/1998 | Tozaki et al. | 386/46 |

*Primary Examiner*—Robert Chevalier
*Attorney, Agent, or Firm*—Morgan, Lewis & Bockius LLP

[57] ABSTRACT

A recording apparatus for recording record information onto a record medium to be reproduced by a reproducing apparatus, is provided with: a process device for dividing the record information into a plurality of partial record informations on the basis of material content information, which indicates a material content of the record information and is given from the external; a controller for generating reproduction control information to control the reproducing apparatus to reproduce the partial record informations in a predetermined order, which is set in advance or which is based on a condition given to the reproducing apparatus from the external at a time of reproduction; and a recording device for recording the partial record informations and the reproduction control information onto the record medium.

15 Claims, 6 Drawing Sheets

| 30 | THE NUMBER OF CONNECTABLE DIVISION UNITS (m) |
| --- | --- |
| 31 | REPRODUCTION CONTROL INFORMATION |
| 32 { 32-1 | REPRODUCTION LEVEL OF CONNECTABLE DIVISION UNIT 1 |
| | CONNECTABLE DIVISION UNIT 1's NUMBER |
| 32-2 | REPRODUCTION LEVEL OF CONNECTABLE DIVISION UNIT 2 |
| | CONNECTABLE DIVISION UNIT 2's NUMBER |
| 32-m | REPRODUCTION LEVEL OF CONNECTABLE DIVISION UNIT m |
| | CONNECTABLE DIVISION UNIT m's NUMBER |

FIG. 4

| b2 | b1 | b0 | CONTENT |
|---|---|---|---|
| 0 | 0 | 0 | WAIT FOR USER KEY INPUT. IF KEY INPUT, AFTER REPRODUTION FINISH OF DIVISION UNIT, BRANCH. UNLESS KEY INPUT, WAIT FOR KEY INPUT IN STILL CONDITION AT LAST DIVISION UNIT FOR TIME INDICATED BY STILL AND REPEAT TIME. UNLESS INPUT, BRANCH INTO CONNECTION DESTINATION OF DEFAULT. |
| 0 | 0 | 1 | WAIT FOR USER KEY INPUT. IF KEY INPUT, IMMEDIATELY BRANCH. UNLESS KEY INPUT, WAIT FOR KEY INPUT IN STILL CONDITION AT LAST SEQUENCY FOR TIME INDICATED BY STILL AND REPEAT TIME. UNLESS INPUT, BRANCH INTO CONNECTION DESTINAION OF DEFAULT. |
| 0 | 1 | 0 | WAIT FOR USER KEY INPUT. IF KEY INPUT, AFTER REPRODUCTION FINISH OF DIVISION UNIT, BRANCH. UNLESS KEY INPUT, WAIT FOR KEY INPUT WHILE REPEATING DIVISION UNIT FOR TIME INDICATED BY REPEAT TIME. UNLESS INPUT, BRANCH INTO CONNECTION DESTINATION OF DEFAULT. |
| 0 | 1 | 1 | WAIT FOR USER KEY INPUT. IF KEY INPUT, IMMEDIATELY BRANCH. UNLESS KEY INPUT, WAIT FOR KEY INPUT WHILE REPEATING DIVISION UNIT FOR TIME INDICATED BY STILL AND REPEAT TIME. UNLESS INPUT, BRANCH INTO CONNECTION DESTINATION OF DEFAULT. |
| 1 | 0 | 0 | RESERVATION |
| 1 | 0 | 1 | RESERVATION |
| 1 | 1 | 0 | RANDOM BRANCH. KEY INPUT IS NOT ACCEPTED. NO STILL OR REPEAT. RANDOMLY BRANCH AT LAST DIVISION UNIT. |
| 1 | 1 | 1 | RANDOM BRANCH. KEY INPUT IS NOT ACCEPTED. NO STILL OR REPEAT. BRANCH INTO CONNECTION DESTINATION HAVING HIGHEST REPRODUCTION LEVEL OF LEVELS PERMITTED AT LAST DIVISION UNIT. |

INFORMATION RECORDING MEDIUM AND INFORMATION REPRODUCING APPARATUS

This is a divisional of application Ser. No. 08/677,196 filed on Jul. 9, 1996 U.S. Pat. No. 5,787,222.

BACKGROUND OF THE INVENTION

1. Field of the Invention

The present invention is related with an information recording apparatus and an information reproducing apparatus. Especially, it is related with an information recording apparatus for recording on a record medium, such as an optical disk and the like, audio information and video information in order to carry out an interactive reproduction operation, and an information reproducing apparatus for reproducing the audio information and the video information suitable for the interactive reproduction operation from the record medium.

2. Description of the Related Art

The audio information and the video information are generally recorded on a record medium, such as an optical disk, a video tape and the like.

The information recorded on the above mentioned record medium has been recorded by using an analog signal. Recently, because of little deterioration of a signal (sound quality and image quality), an easy operation in a computer and the like, a method of recording by using a digital signal is used generally.

The optical disk as the record medium on which this digital signal is recorded is used as the record medium for various information irrespective of video and audio information, since it is capable of a random access.

And, since the optical disk has a large record capacity, and can record much addition information (for controlling the reproduction of main information such as video information and audio information) in addition to the main information, it is used in a special reproduction by using the addition information, in many cases.

Incidentally, in some special reproduction, the reproduction of a predetermined record area is intentionally prohibited in a case of carrying out a usual consecutive reproduction or retrieval.

As an example of such a special reproduction in which the reproduction is intentionally prohibited, there is an interactive reproduction for carrying out a two-way information exchange between a user and a medium.

For example, in a case of an educational interactive reproduction, only a portion of [Question] is reproduced regardless of the reproduction condition, and unless the user carries out a particular operation to answer the [Question], it is prohibited to carry out the information reproduction in the portion of [Answer].

Functions required in this interactive reproduction are listed below, for example.

(1) It is possible to branch into an outline (i.e. reproduction order) specified by a user interface, such as a key input and the like, in line with a plurality of outlines (i.e. reproduction orders) designed by a medium author (who records the information onto the record medium).

(2) It is possible to automatically set reproduction state to a still image reproduction state at a certain video frame.

(3) It is possible to automatically carry out a repeat reproduction for a certain video interval.

(4) The medium author can freely specify a still image reproduction time or a repeat reproduction time.

(5) In a case that a plurality of outlines can be selected freely, a branch destination can be determined freely on a side of the reproducing apparatus.

(6) In a case that a plurality of outlines can be selected on the basis of a predetermined rule, the branch destination can be set automatically on the side of the reproducing apparatus.

As a method of implementing the functions required in the above explained interactive reproduction, there is a method of describing a reproduction procedure in a script form close to a computer language.

If trying to record the reproduction procedure on the optical disk in this script form, a memory capacity becomes large for storing the reproduction procedure on the side of the reproducing apparatus. Especially, in a case that a record capacity of the main information itself is large, such as a case that an actually photographed animation image and a high quality sound are recorded as the main information, the capacity to store the reproduction procedure becomes certainly large. Thus, in a case that a memory capacity of a memory for the sum is limited in the reproducing apparatus, there is a problem that it is impossible to record an excessively complex reproduction procedure.

Further, in a case of contrarily using a complex reproduction procedure to reproduce, it is necessary to make the memory capacity on the side of the reproducing apparatus larger, and this results in a problem of cost increase.

SUMMARY OF THE INVENTION

It is therefore an object of the present invention to provide an information recording apparatus and an information reproducing apparatus, which can implement functions required in an interactive reproduction while restricting the increase of the load on the side of the information reproducing apparatus.

The above object of the present invention can be achieved by a recording apparatus for recording record information onto a record medium to be reproduced by a reproducing apparatus. The recording apparatus is provided with: a process device for dividing the record information into a plurality of partial record informations on the basis of material content information, which indicates a material content of the record information and is given from the external; a controller for generating reproduction control information to control the reproducing apparatus to reproduce the partial record informations in a predetermined order, which is set in advance or which is based on a condition given to the reproducing apparatus from the external at a time of reproduction: and a recording device for recording the partial record informations and the reproduction control information onto the record medium.

According to the recording apparatus of the present invention, the record information is divided into a plurality of partial record informations on the basis of material content information by the process device. Then, the reproduction control information to control the reproducing apparatus to reproduce the partial record informations in the predetermined order is generated by the controller. Finally, the partial record informations and the reproduction control information are recorded onto the record medium, by the recording device.

Consequently, when the record medium, which has been recorded by the above described recording apparatus, is reproduced by the reproducing apparatus, by use of the reproduction control information which can be reproduced from the record medium besides the partial record informations (e.g. the video and audio information), it is possible to perform an interactive reproduction, which does not increase the load on the reproducing apparatus so much and which is in line with the intention of the medium author, based on the reproduced reproduction control information.

In one aspect of the recording apparatus of the present invention, the controller generates the reproduction control information including branch destination information for specifying at least one second partial record information to be branched from a first partial record information.

According to this aspect, the reproduction control information includes the branch destination information for specifying at least one second partial record information to be branched from a first partial record information. Thus, at the time of reproducing the first partial record information, it is possible to easily specify the branch destination (i.e. the second partial record information) by referring to the branch destination information which can be reproduced from the record medium besides the partial record information. Consequently, it is possible to perform the interactive reproduction more easily by the reproducing apparatus.

In this aspect, the branch destination information may includes reproduction level information for the reproducing apparatus to judge whether the reproduction of each partial record information to be branched is permitted or prohibited by a level indicated by the reproduction level information. In this case, at the time of reproducing the first partial record information, it is possible to easily judge whether or not the reproduction of the branch destination (i.e. the second partial record information) is permitted or prohibited by referring to the reproduction level information. Consequently, it is possible to easily perform the interactive reproduction of only the permitted partial record information by the reproducing apparatus.

Also, in this aspect, the branch destination information may include branch timing information for the reproducing apparatus to judge, in a case that a branch command is given to the reproducing apparatus from the external, whether the branch command causes the reproducing apparatus to immediately branch into the partial record information at a branch destination or to branch into the partial record information at the branch destination after finishing the reproduction of the partial record information presently reproduced at a timing when the branch command is given. In this case, at the time of reproducing the first partial record information, it is possible to realize various patterns of branching by referring to the branch timing information. Consequently, it is possible to easily perform the interactive reproduction in various manner in line with the intention of the medium author by the reproducing apparatus.

Further in this aspect, the branch destination information may include random branch information to cause, in a case that a branch command is generated in the reproducing apparatus, the reproducing apparatus to randomly select a branch destination from a predetermined plurality of partial record informations after finishing the reproduction of the partial record information presently reproduced at a timing when the branch command is generated, so as to branch thereto. In this case, at the time of reproducing the first partial record information, it is possible to automatically realize various patterns of branching by referring to the branch timing information. Consequently, it is possible to easily perform the interactive reproduction in various manner automatically by the reproducing apparatus.

In another aspect of the recording apparatus of the present invention, the controller generates the reproduction control information including pre-branch reproduction control information for controlling a reproduction state of the reproducing apparatus before branching with respect to at least one of the partial record informations.

According to this aspect, the reproduction control information includes the pre-branch reproduction control information for controlling the reproduction state before branching. Thus, at the time of reproducing the partial record information, it is possible to easily control the reproduction state before branching by referring to the pre-branch reproduction control information. Consequently, it is possible to easily control the pre-branch operation in the interactive reproduction by the reproducing apparatus.

In this aspect, the pre-branch reproduction control information may include still image reproduction time information, which indicates a time duration for performing a still image reproduction, or repeat reproduction time information, which indicates a time duration for performing a repeat reproduction. In this case, as the reproduction state before branching, the still image reproduction or the repeat reproduction can be realized. Consequently, it is possible to easily perform the still image reproduction or the repeat reproduction during the waiting time for the inputting operation in the interactive reproduction.

The above object of the present invention can be also achieved by a reproducing apparatus for reproducing a record medium, on which a plurality of partial record informations obtained by dividing record information into the partial record informations on the basis of predetermined material content information, which indicates a material content of the record information, and reproduction control information to control the reproducing apparatus to reproduce the partial record informations in a predetermined order, which is set in advance or which is based on a condition given to the reproducing apparatus from the external at a time of reproduction. The reproducing apparatus is provided with: a reading device for reading information from the record medium; an extracting device for extracting the reproduction control information from the read information; a reproducing device for reproducing the partial record informations; and a controller for controlling the reproducing device to reproduce the partial record informations in the predetermined order on the basis of the extracted reproduction control information or on the basis of the condition given from the external at the time of reproduction.

According to the reproducing apparatus of the present invention, the information is read from the record medium by the reading apparatus. Then, the reproduction control information is extracted from the read information by the extracting device. Then, by the controller, the reproducing device is controlled to reproduce the partial record informations in the predetermined order on the basis of the extracted reproduction control information or on the basis of the condition given from the external.

Consequently, by use of the reproduction control information which can be reproduced from the record medium besides the partial record informations (e.g. the video and audio information), an interactive reproduction can be performed, which does not increase the load on the reproducing apparatus so much and which is in line with the intention of the medium author, based on the reproduced reproduction control information.

In one aspect of the reproducing apparatus of the present invention, the reproduction control information includes branch destination information for specifying at least one second partial record information to be branched from a first partial record information; and the controller controls the reproducing device to reproduce the second partial record information specified by the branch destination information in the extracted reproduction control information after reproducing the first partial record information.

According to this aspect, the reproducing device is controlled by the controller to reproduce the second partial record information specified by the branch destination information in the extracted reproduction control information after reproducing the first partial record information. Thus, the branch destination (i.e. the second partial record information) can be easily specified by referring to the branch destination information which can be reproduced from the record medium besides the partial record information. Consequently, the interactive reproduction can be performed more easily by the reproducing apparatus.

In this aspect, the branch destination information may include reproduction level information for the reproducing apparatus to judge whether the reproduction of each partial record information to be branched is permitted or prohibited by a level indicated by the reproduction level information; and the controller compares the level indicated by the reproduction level information with a level indicated by a standard reproduction level information which is set to the reproducing apparatus in advance, and controls the reproducing device to reproduce the partial record information only in a case that the reproduction of the partial record information is permitted as a result of comparison. In this case, it can be easily judged whether or not the reproduction of the branch destination (i.e. the second partial record information) is permitted or prohibited by referring to the reproduction level information. Consequently, the interactive reproduction of only the permitted partial record information can be easily performed by the reproducing apparatus.

Also in this aspect, the branch destination information may include branch timing information for the reproducing apparatus to judge, in a case that a branch command is given to the reproducing apparatus from the external, whether the branch command causes the reproducing apparatus to immediately branch into the partial record information at a branch destination or to branch into the partial record information at the branch destination after finishing the reproduction of the partial record information presently reproduced at a timing when the branch command is given; and the controller judges whether the given branch command causes the reproducing apparatus to immediately branch into the partial record information or to branch into the partial record information after finishing the reproduction on the basis of the branch timing information, and controls the reproducing device to reproduce the partial record information according to a result of judgment. In this case, it is possible to realize various patterns of branching by referring to the branch timing information. Consequently, it is possible to easily perform the interactive reproduction in various manner in line with the intention of the medium author by the reproducing apparatus.

Further in this aspect, the branch destination information may include random branch information to cause, in a case that a branch command is generated in the reproducing apparatus, the reproducing apparatus to randomly select a branch destination from a predetermined plurality of partial record informations after finishing the reproduction of the partial record information presently reproduced at a timing when the branch command is generated, so as to branch thereto. In this case, various patterns of branching can be automatically realized by referring to the branch timing information. Consequently, the interactive reproduction in various manner can be easily performed automatically by the reproducing apparatus.

Further, in this aspect, the branch destination information may include random branch information to cause, in a case that a branch command is generated in the reproducing apparatus, the reproducing apparatus to randomly select a branch destination from a predetermined plurality of partial record informations after finishing the reproduction of the partial record information presently reproduced at a timing when the branch command is generated; and the controller randomly selects the branch destination after finishing the reproduction of the partial record information presently reproduced at a timing when the branch command is generated on the basis of the random branch information, and controls the reproducing device to reproduce the selected partial record information. In this case, various patterns of branching can be automatically realized by referring to the branch timing information. Consequently, the interactive reproduction can be easily performed in various manner automatically by the reproducing apparatus.

In another aspect of the present invention, the reproduction control information comprises pre-branch reproduction control information for controlling a reproduction state of the reproducing apparatus before branching with respect to at least one of the partial record informations; and the controller controls the reproducing device to be in a reproduction state indicated by the pre-branch reproduction control information in the extracted reproduction control information before branching.

According to this aspect, the reproduction control information includes the pre-branch reproduction control information for controlling the reproduction state before branching. Thus, the reproduction state before branching can be easily controlled by referring to the pre-branch reproduction control information. Consequently, the pre-branch operation can be easily controlled in the interactive reproduction by the reproducing apparatus.

In this aspect, the pre-branch reproduction control information comprises still image reproduction time information, which indicates a time duration for performing a still image reproduction, or repeat reproduction time information, which indicates a time duration for performing a repeat reproduction; and the controller controls the reproducing device to perform the still image reproduction for the time duration indicated by the still image reproduction time information, or perform the repeat reproduction for the time duration indicated by the repeat reproduction time information. In this case, as the reproduction state before branching, the still image reproduction or the repeat reproduction can be realized. Consequently, the still image reproduction or the repeat reproduction can be easily performed during the waiting time for the inputting operation in the interactive reproduction.

DESCRIPTION OF THE PREFERRED EMBODIMENTS

Preferred embodiments of the present invention will be now explained with reference to the accompanying drawings.

(I) Information Recording Apparatus

Figure 1:
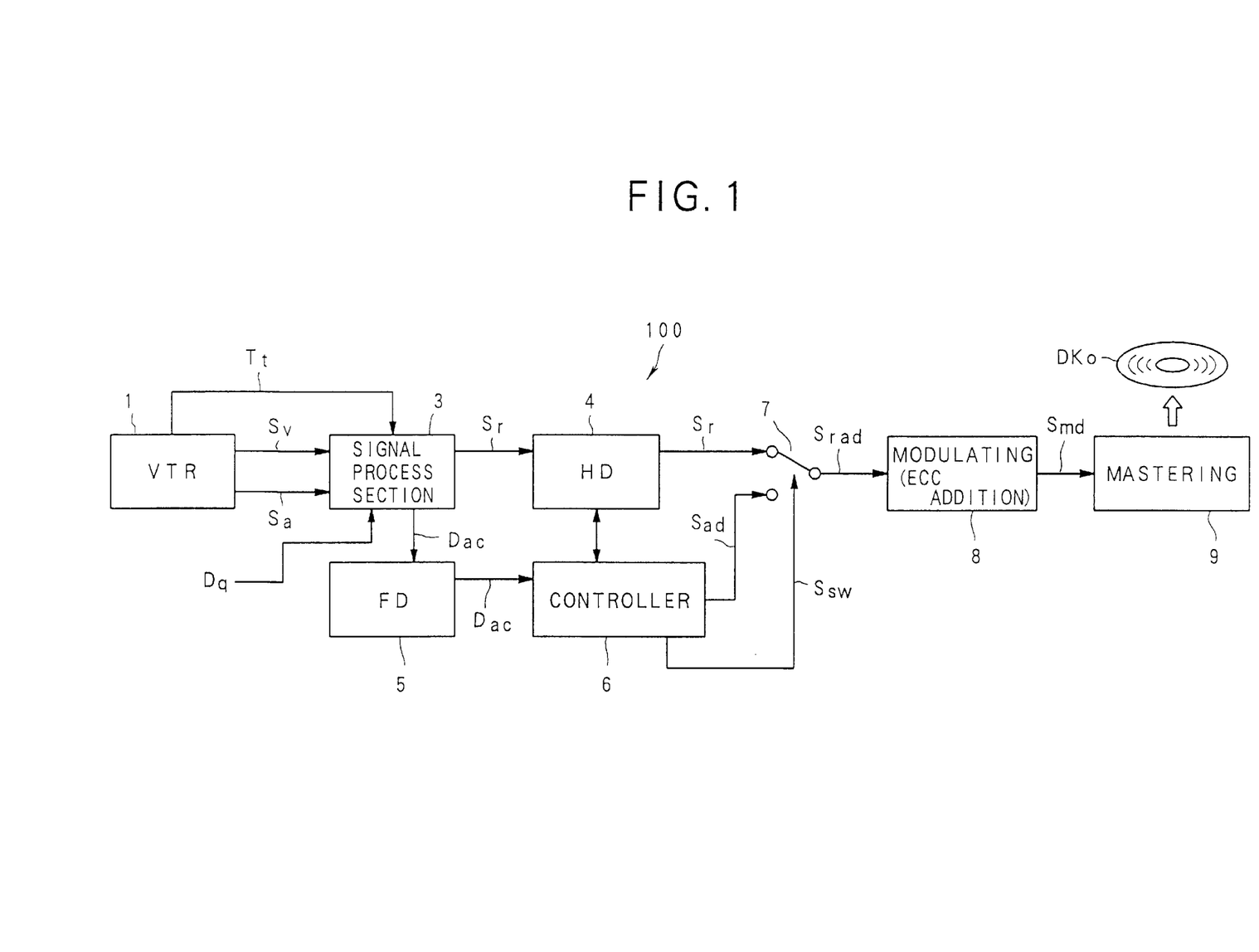
FIG. 1 is a block diagram showing a schematic configuration of an information recording apparatus of an embodiment.

FIG. 1 shows a block diagram of an information recording apparatus of the embodiment.

In FIG. 1, an information recording apparatus 100 is provided with a VTR (Video Tape Recorder) 1, a signal process section 3, a hard disk (HD) device 4, a flexible disk (FD) device 5, a controller 6, a switching section 7, a modulating section 8 and a mastering device 9.

The VTR 1 reproduces a magnetic tape on which record information, such as audio information, video information and the like to be recorded onto an original disk DKo, is recorded, and outputs a time code Tr, a video signal Sv and an audio signal Sa.

The signal control section 3 A/D-converts the video signal Sv and the audio signal Sa outputted from the VTR 1, and then compresses the video signal Sv for every GOP (Group Of Pictures) by means of the MPEG (Motion Picture Experts Group, which is an international standardization meeting for accumulation medium animation image encoding) method. Then, the signal process section 3 time-axis-multiplexes these signals by a packet unit to output a compression multiplexing data Sr. The signal process section 3 also divides the time code Tt corresponding to the above mentioned record information outputted from the VTR 1 and the record information recorded on the magnetic tape in advance into the partial record informations for every material content. On the basis of a queue data Dq corresponding to each of the partial record informations and the time code Tt, the signal process section 3 detects a reproduction time in a case of reproducing the pertinent partial record information for each of the partial record informations and a start address in the record information of each of the partial record informations, to output a material content information data Dac.

The hard disk device 4 temporarily stores the compression multiplexing data Sr. The flexible disk device 5, such as a floppy disk device, temporarily records the material content information data Dac. The controller 6 controls the information recording apparatus 100 as a whole, and also on the basis of the compression multiplexing data Sr read out from the hard disk device 4 and the material content data Dac read out from the flexible device 5, outputs various addition information data Sad, and further outputs an information selection signal Ssw for selecting one of the multiplexing compression data Sr and the addition information data Sad as data to be outputted to the modulating section 8. The switching section 7 selects, on the basis of the information selection signal Ssw, one of the multiplexing compression data Sr and the addition information data Sad, and outputs it as an information addition compression multiplexing data Srad. The modulating section 8 carries out an addition of an error correction code (ECC), such as a REED SOLOMON sign and the like, and a modulation, such as a 8–15 modulation and the like, to the information addition compression multiplexing data Srad, and outputs it as a modulation signal Smd. The mastering device 9 prepares the original disk DKo to be a master disk for replicating a plurality of optical disks, on the basis of the modulation signal Smd.

Now, the addition information data Sad is explained.

The record information corresponding to one material (the video signal Sv and the audio signal Sa) can be divided in advance into the partial record informations for every material content, and the addition information data Sad are constituted in association with each of the partial record informations.

Figure 2:
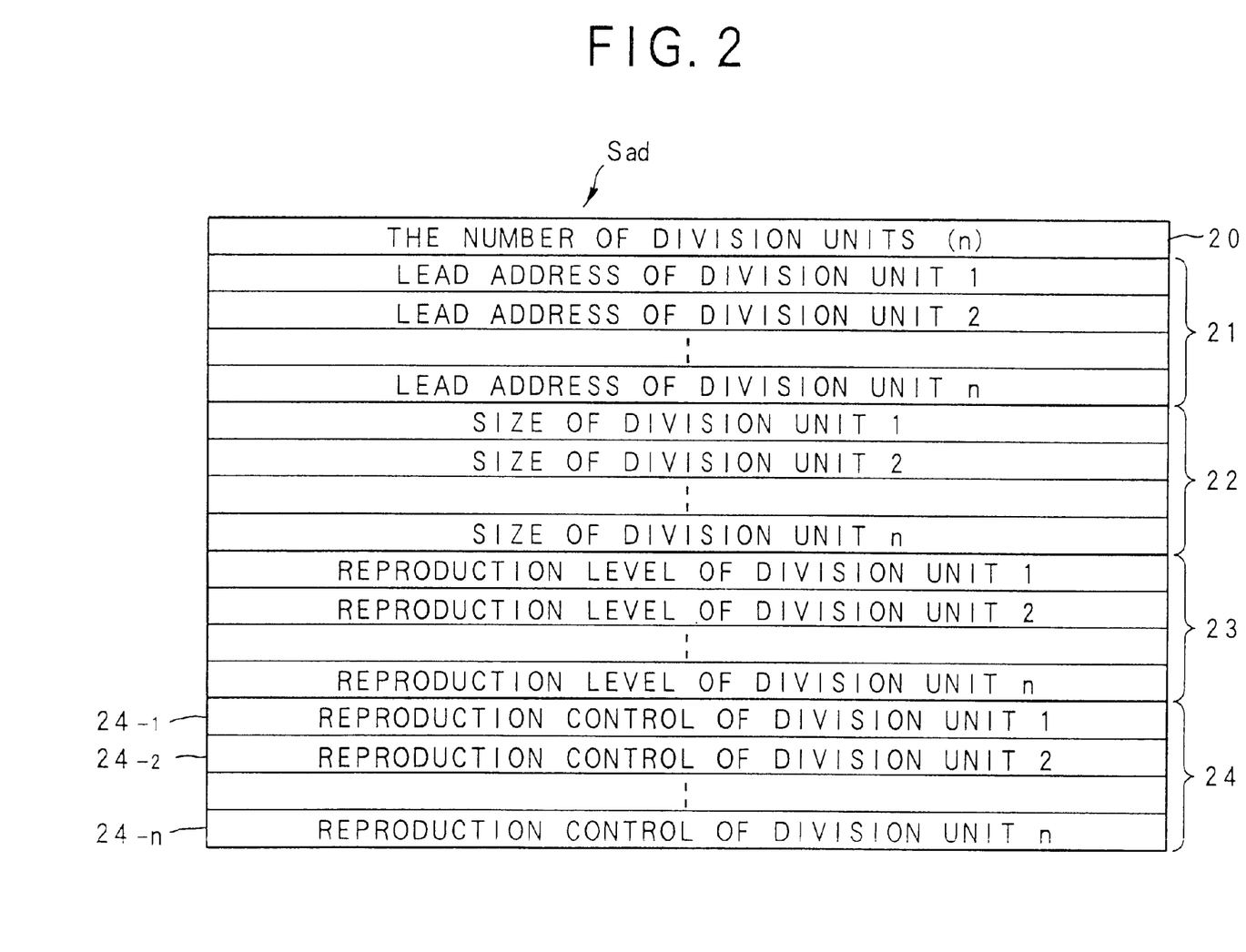
FIG. 2 is a diagram explaining addition information data used in the embodiment.

As shown in FIG. 2, the addition information data Sad is roughly provided with a division unit number data 20, a lead address data group 21, a size data group 22, a reproduction level data group 23 and a reproduction control data group 24. The division unit number data 20 indicates the number (=n) of the division units corresponding to the partial record informations. The lead address data group 21 is composed of lead address data indicating a lead address for every division unit corresponding to each of the partial record informations. The size data group 22 is composed of size data indicating a size for every division unit corresponding to each of the partial record informations. The reproduction level data group 23 is composed of reproduction level data for setting a reproduction level at the pertinent division unit for every division unit corresponding to each of the partial record informations, that is, a target (level) that a reproduction for a child, an adult or the like should be permitted. The reproduction control data group 24 is composed of reproduction control data 24-1 to 24-n for carrying out a reproduction control at the division unit corresponding to each of the partial record informations.

Figure 3:
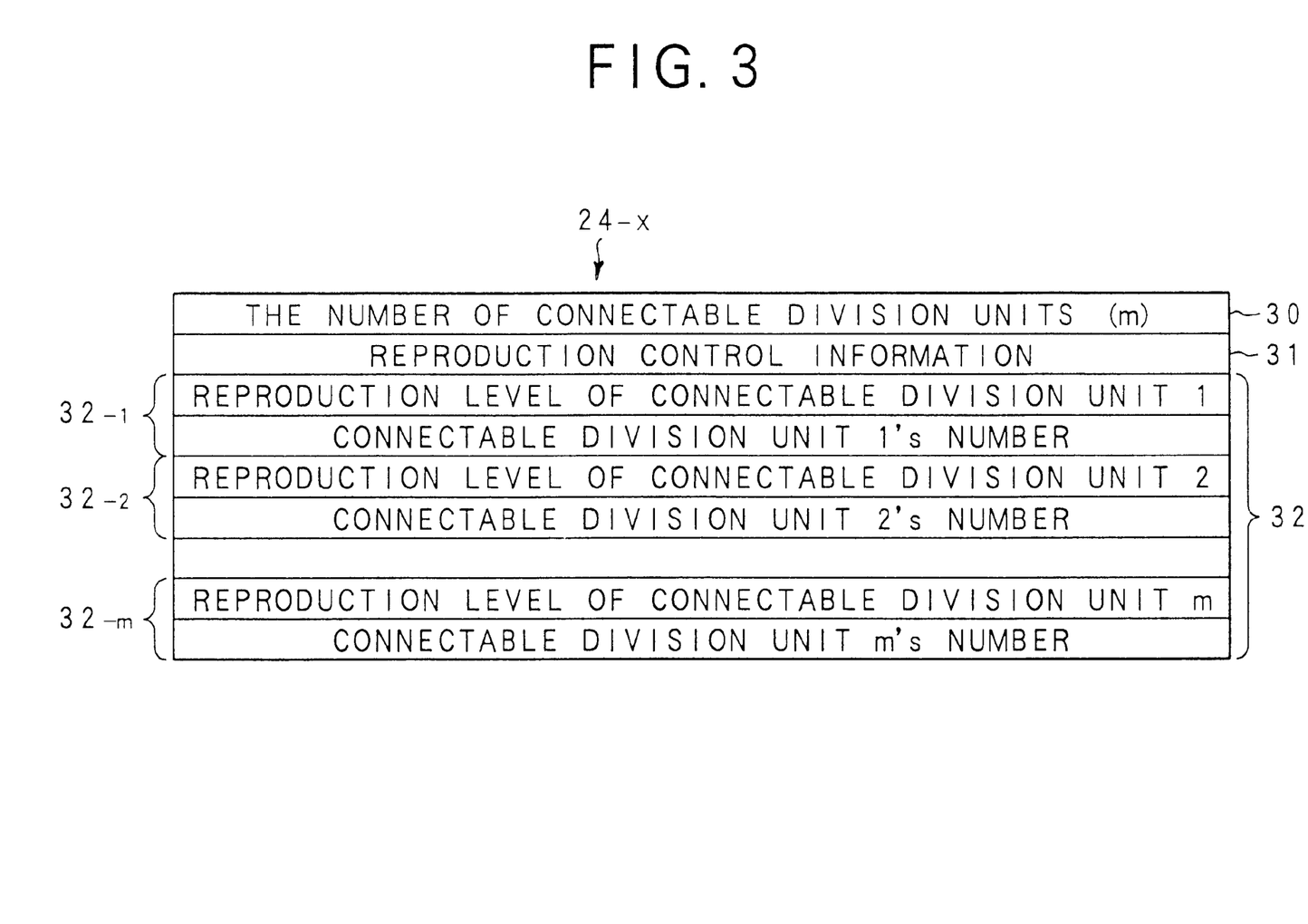
FIG. 3 is a diagram explaining reproduction control data used in the embodiment.

As shown in FIG. 3, the reproduction control data 24-x (x=1 to n) constituting the reproduction control data group 24 is provided with a connectable division unit number data 30, a reproduction control information data 31 and a connection portion record information data group 32. The connectable division unit number data 30 indicates a number (connectable division unit number m) of other partial record informations (=division units) that can be connected (reproduced continuously) to the pertinent reproduction control data 24-x. The reproduction control information data 31 is intended to carry out the reproduction control of the partial record information corresponding to the pertinent reproduction control data 24-x. The connection portion record information data group 32 is composed of connection portion record information data 32-1 to 32-n indicating the reproduction level of the other partial record information that can be connected to the pertinent reproduction control data 24-x and the number to specify the other partial record information.

Now, the reproduction control information data 31 is explained.

The reproduction control information data 31 is provided with three-bit control information data composed of three bits of bits b2 to b0, and still and repeat time information data.

At first, the three-bit control information data is explained with reference to FIG. 4.

Figure 4:
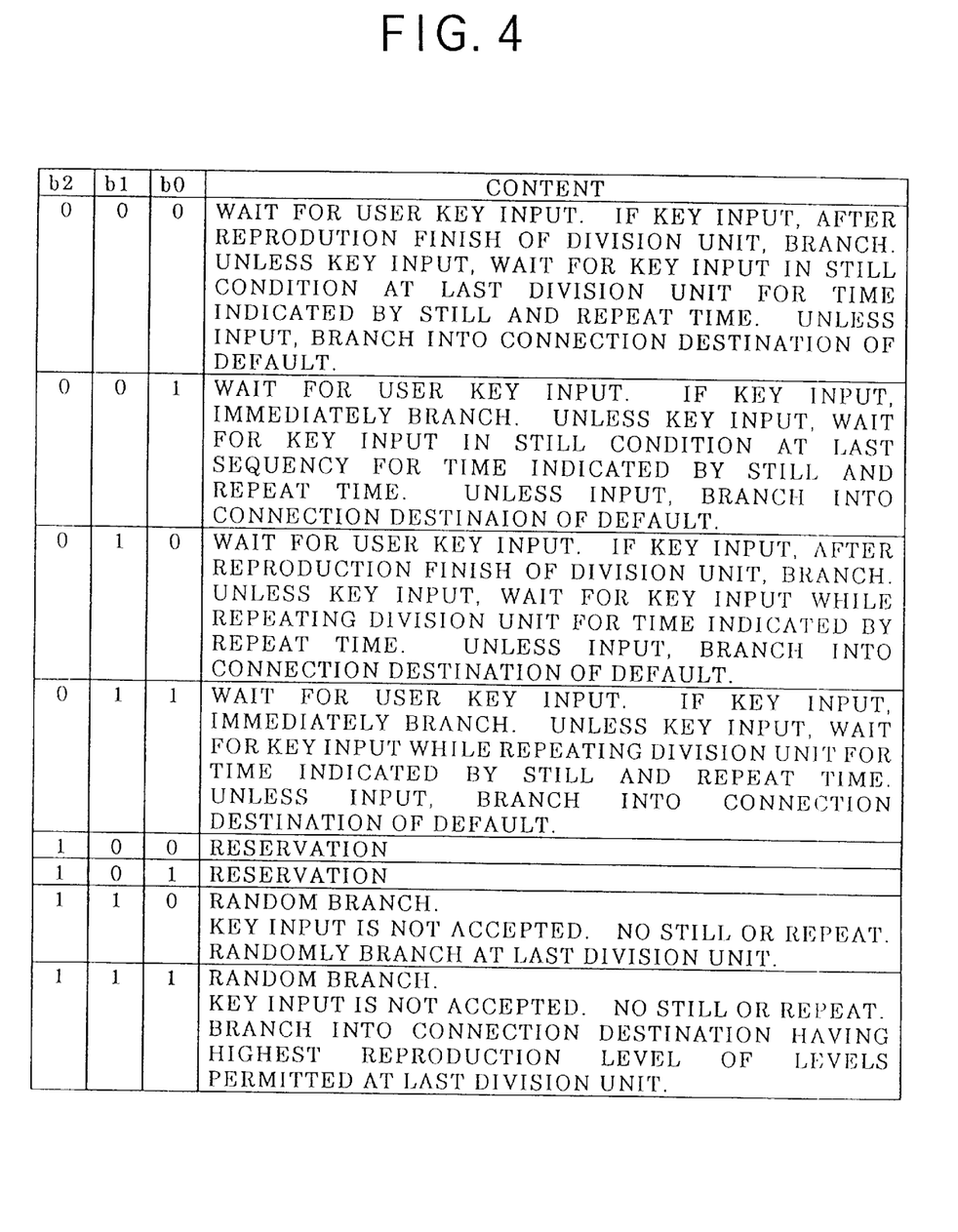
FIG. 4 is a table for explaining three-bit control information used in the embodiment.

As shown in FIG. 4, a first bit b2 of the three-bit control information data is a branch form setting flag for controlling to branch into other partial record information on the basis of a user selection, or to branch into other partial record information on the basis of judgment of the reproducing apparatus. For example, it is assumed to branch into the other partial record information on the basis of the judgment of the reproducing apparatus by setting the first bit b2=1.

In FIG. 4, since a second bit b1 and a third bit b0 are different from each other in meaning thereof on the basis of a value of the first bit b2, the explanation is carried out for every value of the first bit b2.

(a) In a case of the first bit b2=0 (the branch by the user selection):

The second bit b1 is a reproduction form setting flag for controlling whether it is set to a still image reproduction state or a repeat reproduction state after the reproduction of presently reproduced partial record information (division unit under reproduction) is finished. For example, at a time of the second bit b1=1, it is set to the repeat reproduction state.

The third bit b0 is a branch condition setting flag for controlling whether it immediately corresponds to a predetermined key input during reproducing the partial record information (division unit) and immediately branches into the reproduction of the partial record information at a branch destination or branches into the reproduction of the partial record information at the branch destination after the reproduction of the pertinent partial record information is finished. For example, at a time of the third bit b0=1, it branches immediately.

(b) In a case of the first bit b2=1 (the branch on the basis of the judgment of the reproducing apparatus):

In this case, a branch state is different on the basis of a combination of the second bit b1 and the third bit b0.

In a case that the second bit b1=0 and the third bit b0=0, in this embodiment, it is in a reservation state, and thereby it is not used.

In a case that the second bit b1=0 and the third bit b0=1, in this embodiment, it is in the reservation state, and thereby it is not used.

In a case that the second bit b1=1 and the third bit b0=0, the key input is not accepted to receive, and it does not shift to the still image reproduction operation or the repeat reproduction operation. Then, after the reproduction of the pertinent partial record information is finished (i. e. after the last division unit), it randomly branches into other partial record information that can be branched.

In a case that the second bit b1=1 and the third bit b0=1, the key input is not accepted to receive, and it does not shift to the still image reproduction operation or the repeat reproduction operation. After the reproduction of the pertinent partial record information is finished (i.e. after the last division unit), it branches into the other partial record information having the highest reproduction level (the widest permission range) of other partial record informations that can be branched.

The still and repeat time information data is data for setting a time for which the still image reproduction operation or the repeat reproduction operation is carried out in a key input waiting state in a case of the first bit b2 of the three-bit control information data=0. In a case that the key input is not carried out within a time indicated by the still and repeat time information data, or in a case that a normal key input is not carried out, it branches into predetermined (default) other partial record information (division unit). In this case, the predetermined other partial record information is assumed to be, for example, partial record information (division unit 1) described at the beginning of the addition information data Sad.

As the setting of a more actual still and repeat time information data T, assuming that the still and repeat time information data T has 8 bits:

in a case of $0 \leq T \leq 60$, let the still image reproduction time or the repeat reproduction time be T [second];

in a case of $60 < T \leq 254$, assuming the still image reproduction time or the repeat reproduction time to be TT, let TT=(t−60)×10+60 [sec]; and in a case of T=255, until the key input is carried out, the still image reproduction or the repeat reproduction is carried out, that is, let TT=∞.

Figure 5:
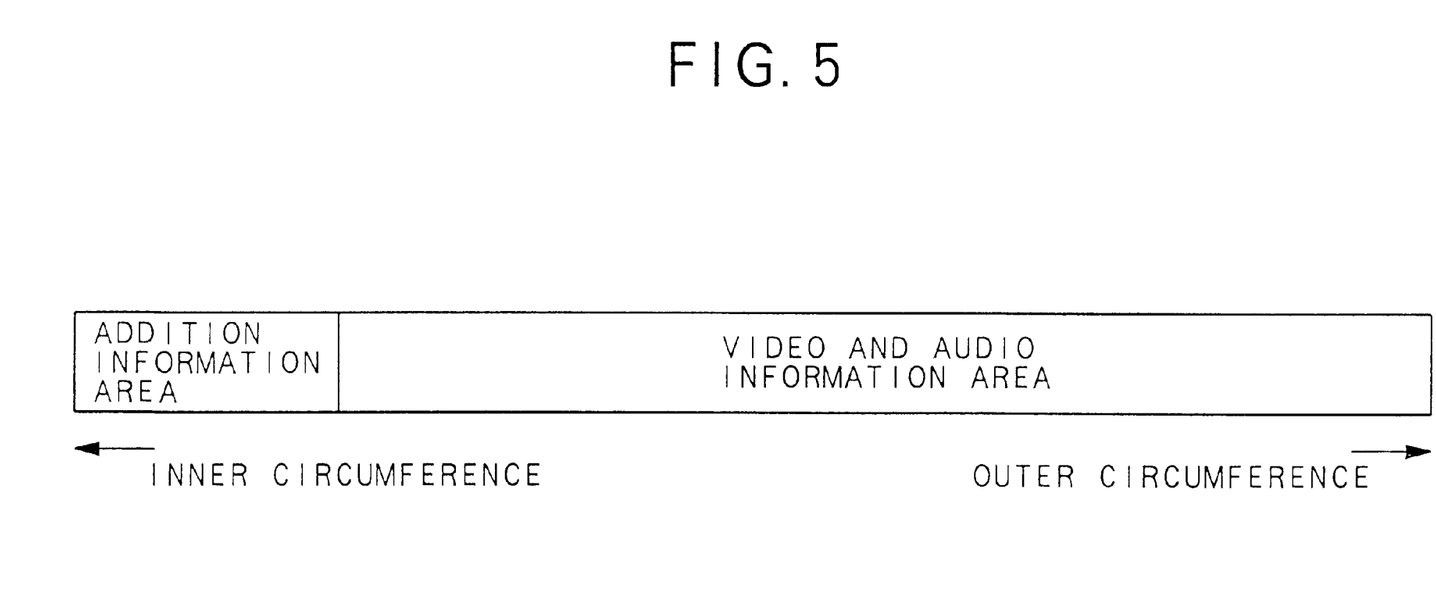
FIG. 5 is a diagram explaining an information record state of an optical disk in the embodiment.

As shown in FIG. 5, the above mentioned addition information Sad is recorded on an addition information area at the most inner circumference side (i.e. the lead-in area) of the optical disk.

Next, an operation of the information recording apparatus 100 will be explained with reference with FIG. 1.

When the VTR 1 reproduces the magnetic tape on which the record information, such as the audio information, the video information and the like to be recorded onto the original disk DKo, is recorded, and outputs the time code Tt, the video signal Sv and the audio signal Sa, the signal process section 3 A/D-converts the video signal Sv and the audio signal Sa outputted from the VTR 1, and then compresses the video signal Sv for every GOP (Group Of Pictures) by means of the MPEG method, time-axis-multiplexes these signals by the packet unit and outputs the compression multiplexing data Sr to the hard disk device 4. The signal process section 3 also divides the time code Tt corresponding to the above mentioned record information outputted from the VTR 1 and the record information recorded on the magnetic tape in advance into the partial record informations for every material content. Then, on the basis of the queue data Dq corresponding to each of the partial record informations and the time code Tt, the signal process section 3 detects the reproduction time in a case of reproducing the pertinent partial record information for each of the partial record informations and the start address in the record information of each of the partial record informations, and outputs the material content information data Dac to the flexible disk device 5.

The compression multiplexing data Sr stored in the hard disk device 4 is outputted to the switching section 7 under the control of the controller 7.

And, the flexible disk device 5 temporarily records the material content information data Dac on a flexible disk and outputs the material content information data Dac to the controller 6 under the control of the controller 6.

In parallel to the outputs of the compression multiplexing data Sr and the material content information data Dac, the controller 6 outputs, on the basis of the compression multiplexing data Sr and the material content information data Dac, the addition information data Sad to the switching section 7, and also outputs the information selection signal Ssw to the switching section 7 for selecting one of the multiplexing compression data Sr and the addition information data Sad as the data to be outputted to the modulating section 8.

Accordingly, the switching section 7 selects one of the multiplexing compression data Sr and the addition information data Sad on the basis of the information selection signal Ssw and outputs the information addition compression multiplexing data Srad to the modulating section 8.

The modulating section 8 carries out the addition of the error correction code (ECC), such as the REED SOLOMON sign and the like, and the modulation, such as the 8–15 modulation and the like, to the information addition compression multiplexing data Srad, and outputs the modulation signal Smd to the mastering device 9.

The mastering device 9 prepares the original disk DKo as the master disk on the basis of the modulation signal Smd.

In this way, in the original disk DKo to which the mastering is applied, the addition information data Sad is recorded in the most inner circumference (i. e. the lead-in area) of the original disk DKo, for example. A replica disk in which the addition information data Sad is recorded in the most inner circumference is fabricated by a replication device by using this original disk DKo as the master disk.

(II) Information Reproducing Apparatus

Next, a configuration of the information reproducing apparatus will be explained with reference to FIG. 6.

Figure 6:
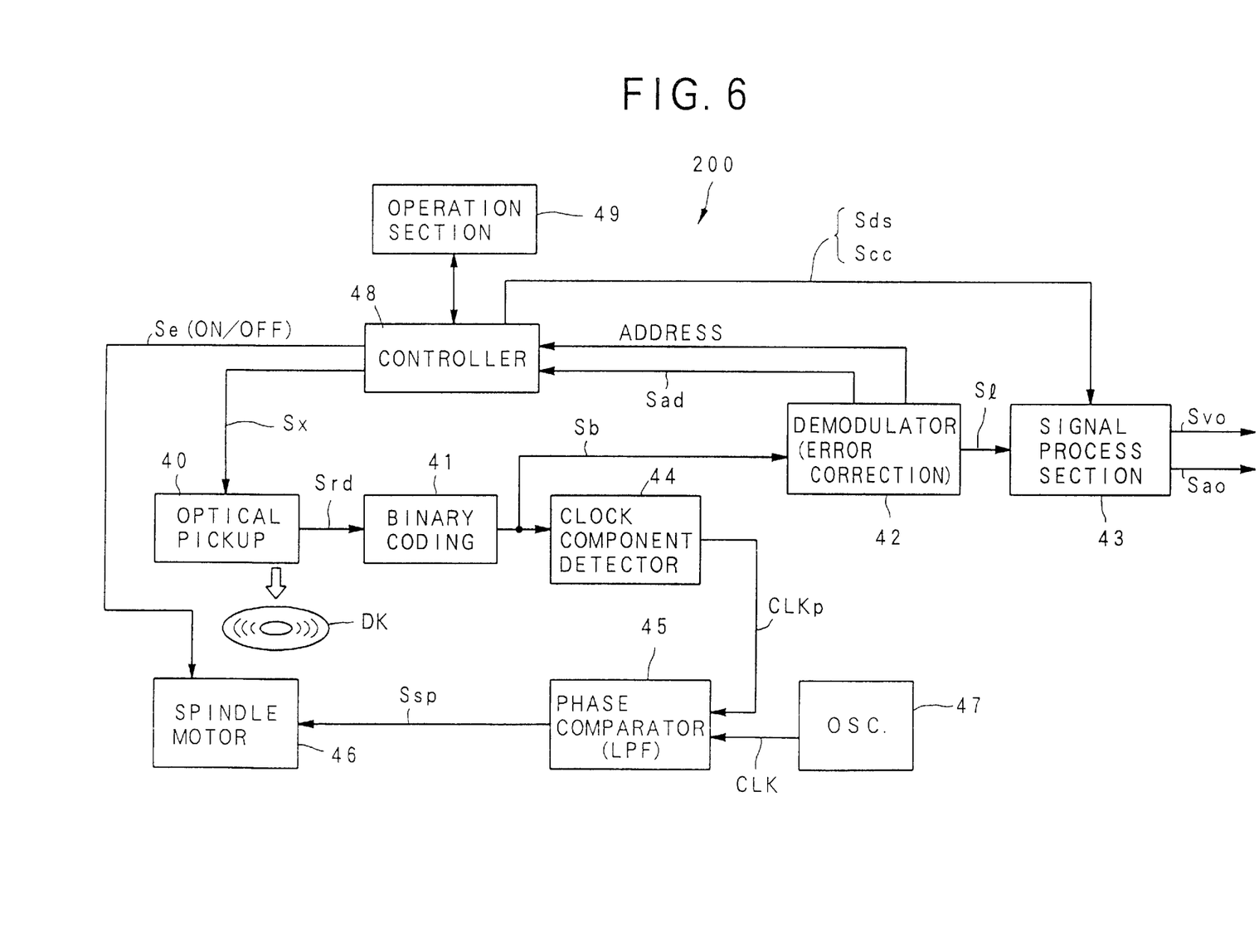
FIG. 6 is a block diagram showing a schematic configuration of an information reproducing apparatus of the embodiment.

In FIG. 6, an information reproducing apparatus 200 is provided with an optical pickup 40, a binary coding device 41, a demodulator 42, a signal process section 43, a clock component detector 44, a phase comparator 45, a spindle motor 46, an oscillator 47, a controller 48 and an operation section 49.

The optical pickup 40 reads out the record information of an optical disk DK, which is manufactured by replicating the original disk DKo recorded by the information recording apparatus 100 of FIG. 1 and on which the addition information data Sad is recorded, and outputs it as a read signal Srd. The binary coding device 41 converts the read signal Srd into a binary digit on the basis of a constant threshold, and outputs it as a binary signal Sb.

The demodulator 42 carries out a demodulation and an error correction to the binary signal Sb, outputs it as a demodulation signal S1 and also extracts the addition information data Sad from the binary signal Sb and outputs it to the controller 48. The signal process section 43 extends the demodulation signal S1 by means of the MPEG method, D/A-converts and outputs an output video signal Svo and an output audio signal Sao.

The clock component detector 44 detects a clock component from the binary signal Sb and outputs it as a detection clock signal CLKp. The phase comparator 45 comprises a LPF (Low Pass Filter) for phase-comparing the detection clock signal CLKp with a standard clock signal CLK from the oscillator 47 to thereby generate a comparison signal and for removing a high frequency band component from the comparison signal by the LPF and outputting it as a rotation number control signal Ssp for the spindle motor 46. The spindle motor 46 rotates the optical disk DK under the rotation number control on the basis of the rotation number control signal Ssp. The oscillator 47 outputs the standard clock signal CLK to set a timing synchronization between respective elements constituting the information reproducing apparatus 200.

The controller 48 controls the information reproducing apparatus 200 as a whole, and also carries out the reproduction control on the basis of the addition information data Sad, and further outputs a spindle control signal Se to control the ON/OFF of the spindle motor 46, a signal output control signal Sds and a slider control signal Sx to reproduce the partial record information corresponding to a reproduction position, and a reproduction control signal Scc to carry out the still image reproduction or the repeat reproduction.

The operation section 49 is provided with: various operation switches by which the user can input the instructions to perform normal and special reproductions e.g. a scanning operation, a search operation, a slow operation; and an operation panel for displaying the operation condition of the information reproducing apparatus 200.

Next, the reproduction operation will be explained.

The controller 48, when a command of a reproduction start is inputted from the operation section 49 such as a remote controller and the like, outputs the spindle control signal Se to drives the spindle motor 46, and rotates the optical disk DK, so as to start the reproduction.

Then, the controller 48 outputs the slider control signal Sx to the optical pickup 40, moves it to a defined read position, and also causes the optical pickup 40 to read out the record information on the optical disk DK to output the read signal Srd to the binary coding device 41.

The binary coding device 41 converts the output read signal Srd into the binary digit on the basis of the constant threshold and outputs the binary signal Sb to the demodulator 42 and the clock component detector 44.

Accordingly, the demodulator 42 carries out the demodulation and the error correction to the binary signal Sb, outputs the demodulation signal S1 to the signal process section 43 and also extracts the addition information data Sad from the binary signal Sb, and outputs it to the controller 48.

In parallel to this, the clock component detector 44 detects the clock component from the binary signal Sb and outputs the detection clock signal CLKp. And, the phase-comparator 45 phase-compares the detection clock signal CLKp with the standard clock signal CLK from the oscillator 47 to thereby generate the comparison signal, and removes the high frequency band component from the pertinent comparison signal and outputs the rotation number control signal Ssp of the spindle motor 46 to the spindle motor 46.

The controller 48 reproduces the record information, and also judges the partial record information (division unit) to which a present reproduction position corresponds, from the inputted addition information data Sad and an address of presently reproduced record information.

And, it judges a manner of reproducing the pertinent partial record information from the reproduction control information data 31 of the reproduction control data 24-x corresponding to the presently reproduced partial record information shown in FIG. 3, Namely, depending on the content of the three-bit control information, the reproduction operation is performed differently as following.

(a) In a case that the first bit b2=0, the second bit b1=0 and the third bit b0=0 which constitute the three-bit control information:

It waits for the key input of the user through the operation section 49. If the key input is done, it continues the reproduction until the last of presently reproduced partial record information (division unit). After the reproduction is finished, it branches into the partial record information at a branch destination corresponding to the inputted key.

In this case, in a case that the reproduction is carried out up to the last of the pertinent partial record information while waiting for the key input, it shifts to the still image reproduction operation on the basis of the reproduction control signal Scc, and becomes further in the key input waiting state.

After that, in a case that the key input is done within the time indicated by the still and repeat time information data, it branches into a branch destination corresponding to the inputted key.

And, in a case that the key input is not done within the time indicated by the still and repeat time information data, or in a case that the normal key input is not done, it branches into predetermined (default) other partial record information (division unit).

(b) In a case that the first bit b2=0, the second bit b1=0 and the third bit b0=1 which constitute the three-bit control information:

It waits for the key input of the user through the operation section 49. If the key input is done, it immediately branches into the partial record information at a branch destination corresponding to the inputted key.

In this case, in a case that the reproduction is carried out up to the last of the pertinent partial record information while waiting for the key input, it shifts to the still image reproduction operation on the basis of the reproduction control signal Scc, and becomes further in the key input waiting state.

After that, in a case that the key input is done within the time indicated by the still and repeat time information data, it branches into a branch destination corresponding to the inputted key.

And, in a case that the key input is not done within the time indicated by the still and repeat time information data, or in a case that the normal key input is not done, it branches into predetermined (default) other partial record information (division unit).

(c) In a case that the first bit b2=0, the second bit b1=1 and the third bit b0=0 which constitute the three-bit control information:

It waits for the key input of the user through the operation section 49. If the key input is done, it continues the reproduction until the last of the presently reproduced partial record information (division unit). After the reproduction is finished, it branches into the partial record information at a branch destination corresponding to the inputted key.

In this case, in a case that the reproduction is carried out up to the last of the pertinent partial record information while waiting for the key input, it shifts to the repeat reproduction operation of the partial record information on the basis of the reproduction control signal Scc, and becomes further in the key input waiting state.

After that, in a case that the key input is done within the time indicated by the still and repeat time information data, it branches into the branch destination corresponding to the inputted key.

And, in a case that the key input is not done within the time indicated by the still and repeat time information data, or in a case that the normal key input is not done, it branches into predetermined (default) other partial record information (division unit).

(d) In a case that the first bit b2=0, the second bit b1=1 and the third bit b0=1 which constitute the three-bit control information:

It waits for the key input of the user through the operation section 49. If the key input is done, it immediately branches into the partial record information at a branch destination corresponding to the inputted key.

In this case, in a case that the reproduction is carried out up to the last of the pertinent partial record information while waiting for the key input, it shifts to the repeat reproduction operation of the partial record information on the basis of the reproduction control signal Scc, and becomes further in the key input waiting state.

After that, in a case that the key input is done within the time indicated by the still and repeat time information data, it branches into the branch destination corresponding to the inputted key.

And, in a case that the key input is not done within the time indicated by the still and repeat time information data, or in a case that the normal key input is not done, it branches into predetermined (default) other partial record information (division unit).

(e) In a case that the first bit b2=1, the second bit b1=0 and the third bit b0=0 which constitute the three-bit control information, or that the first bit b2=1, the second bit b1=0 and the third bit b0=1:

Since the reproducing manner is not determined, the controller 48 causes the optical disk DK to be ejected and displays, on a display picture plane of the operation section 49, a message that the pertinent optical disk can not be reproduced, and also becomes in the waiting state until a new optical disk is loaded.

(f) In a case that the first bit b2=1, the second bit b1=1 and the third bit b0=0 which constitute the three-bit control information:

It continues the reproduction until the last of the presently reproduced partial record information (division unit). After the reproduction is finished, it randomly sets a branch destination out of the partial record informations (division unit) that can be reproduced, and then branches thereto.

(g) In a case that the first bit b2=1, the second bit b1=1 and the third bit b0=1 which constitute the three-bit control information:

It continues the reproduction until the last of the presently reproduced partial record information (division unit). After the reproduction is finished, it selects the partial record information (division unit) having the highest reproduction level which does not exceed a pre-specified reproduction level out of the partial record informations (division unit) that can be branched, and then branches thereto.

After that, it repeats operations similar to those of the above mentioned (a) to (g). At a point when the reproduction of the last record information to be reproduced (division unit), that is, the partial record information of a division unit number data 20=0 is finished, it returns the optical pickup 40 to a waiting position at the most inner circumference side on the basis of the slider control signal Sx, and finishes the reproduction operation.

As explained above, according to this embodiment, since it is possible to control an interactive reproduction operation on the basis of the addition information data Sad, even if a memory capacity of a memory on the side of the reproducing apparatus is small, it is possible to easily carry out a complex reproduction control in line with the intention of the medium author.

The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recording medium, which is reproduced by a reproducing apparatus, comprising:

a plurality of partial recorded information obtained by dividing record information into the plurality of partial recorded information, each of which is a discrete segment able to be selectively accessed by the reproducing apparatus;

reproduction control information to control the reproducing apparatus to reproduce the partial recorded information in a predetermined order;

branch destination information for specifying at least one second partial recorded information to be branched from a first partial recorded information; and branch timing information for the reproducing apparatus to judge, in a case that a branch command is given to the reproducing apparatus from the external, whether the branch command causes the reproducing apparatus to immediately branch into the partial recorded information at a branch destination, or to branch into the partial recorded information at the branch destination after finishing the reproduction of the partial recorded information presently reproduced at a timing when the branch command is given.

2. The recording medium according to claim 1, wherein the branch destination information is included in the reproduction control information, and wherein the branch timing information is included in the branch destination information.

3. The recording medium according to claim 1, wherein the branch destination information comprises reproduction level information for indicating whether the reproduction of each partial recorded information to be branched is permitted or prohibited.

4. A recording medium, which is reproduced by a reproducing apparatus, comprising:

a plurality of partial recorded information obtained by dividing record information into the plurality of partial recorded information, each of which is a discrete segment able to be selectively accessed by the reproducing apparatus;

reproduction control information to control the reproducing apparatus to reproduce the partial recorded information in a predetermined order;

branch destination information for specifying at least one second partial recorded information to be branched from a first partial recorded information; and random branch information to cause the reproducing apparatus to randomly select a branch destination from a predetermined plurality of partial recorded information after finishing the reproduction of the partial recorded information presently reproduced.

5. The recording medium according to claim 4, wherein the branch destination information is included in the reproduction control information.

6. The recording medium according to claim 4, wherein the branch destination information comprises reproduction level information for indicating whether the reproduction of each partial recorded information to be branched is permitted or prohibited.

7. A recording medium, which is reproduced by a reproducing apparatus, comprising:

a plurality of partial recorded information obtained by dividing record information into the plurality of partial recorded information, each of which is a discrete segment able to be selectively accessed by the reproducing apparatus;

reproduction control information to control the reproducing apparatus to reproduce the partial recorded information in a predetermined order; and pre-branch reproduction control information for controlling a reproduction state of the reproducing apparatus before branching with respect to at least one of the partial recorded information;

wherein the pre-branch reproduction control information comprises still image reproduction time information, which indicates a time duration for performing a still image reproduction, or repeat reproduction time information, which indicates a time duration for performing a repeat reproduction.

8. The recording medium according to claim 7, wherein the branch destination information is included in the reproduction control information.

9. The recording medium according to claim 7, wherein the pre-branch destination information further comprises reproduction level information for indicating whether the reproduction of each partial recorded information to be branched is permitted or prohibited.

10. A reproducing apparatus for reproducing a recording medium, having a plurality of partial recorded information obtained by dividing record information into the plurality of partial recorded information, each of which is a discrete segment able to be selectively accessed by the reproducing apparatus, reproduction control information to control the reproducing apparatus to reproduce the partial recorded information in a predetermined order, branch destination information for specifying at least one second partial recorded information to be branched from a first partial recorded information, and branch timing information for the reproducing apparatus to judge, in a case that a branch command is externally given to the reproducing apparatus, whether the branch command causes the reproducing apparatus to immediately branch into the partial recorded information at a branch destination, or to branch into the partial recorded information at the branch destination after finishing the reproduction of the partial recorded information presently reproduced at a timing when the branch command is given, the reproducing apparatus comprising:
  means for reading information recorded on the recording medium;
  means for extracting the reproduction control information, the branch destination information and the branch timing information from the read information;
  input means for providing instruction from the external to the reproducing apparatus; and
  means for judging, in a case that a branch command is given by the input means, whether to immediately branch into the partial recorded information at the branch destination or to branch into the partial recorded information at the branch destination on the basis of the extracted branch timing information after finishing the reproduction of the partial recorded information presently reproduced at the timing when the branch command is given.

11. The reproducing apparatus according to claim 10, wherein the branch destination information comprises reproduction level information for indicating whether the reproduction of each partial recorded information to be branched is permitted or prohibited.

12. A reproducing apparatus for reproducing a recording medium, having a plurality of partial recorded information obtained by dividing record information into the plurality of partial recorded information, each of which is a discrete segment able to be selectively accessed by the reproducing apparatus, reproduction control information to control the reproducing apparatus to reproduce the partial recorded information in a predetermined order, branch destination information for specifying at least one second partial recorded information to be branched from a first partial recorded information, and random branch information to cause the reproducing apparatus to randomly select a branch destination from a predetermined plurality of partial recorded information after finishing the reproduction of the partial recorded information presently reproduced, the reproducing apparatus comprising:
  means for reading information recorded on the recording medium;
  means for extracting the reproduction control information, the branch destination information and the random branch information from the read information; and means for randomly selecting the branch destination from the predetermined plurality of partial recorded information on the basis of the extracted random branch information after finishing the reproduction of the partial recorded information presently reproduced.

13. The reproducing apparatus according to claim 12, wherein the branch destination information comprises reproduction level information for indicating whether the reproduction of each partial recorded information to be branched is permitted or prohibited.

14. A reproducing apparatus for reproducing a recording medium, on which a plurality of partial recorded information obtained by dividing record information into the plurality of partial recorded information, each of which is a discrete segment able to be selectively accessed by the reproducing apparatus, reproduction control information to control the reproducing apparatus to reproduce the partial recorded information in a predetermined order, and pre-branch reproduction control information for controlling a reproduction state of the reproducing apparatus before branching with respect to at least one of the partial recorded information, and wherein the pre-branch reproduction control information comprises either still image reproduction time information, which indicates a time duration for performing a still image reproduction, or repeat reproduction time information, which indicates a time duration for performing a repeat reproduction, the reproducing apparatus comprising:

means for reading information recorded on the recording medium;

means for extracting the reproduction control information, the pre-branch reproduction control information and either the still image reproduction time information or the repeat reproduction time information; and means for performing the still image reproduction for the time duration indicated by the extracted still image reproduction time information, or the repeat reproduction for the time duration indicated by the extracted repeat reproduction time information.

15. The reproducing apparatus according to claim 14, wherein the pre-branch destination information further comprises reproduction level information for indicating whether the reproduction of each partial recorded information to be branched is permitted or prohibited.

* * * * *